United States Patent [19]
Collanus

[11] 3,789,464
[45] Feb. 5, 1974

[54] COUPLING RELEASABLE UNDER TENSION
[75] Inventor: Heikki Collanus, Tampere, Finland
[73] Assignee: Oy Tampella Ab, Tampere, Finland
[22] Filed: May 8, 1972
[21] Appl. No.: 251,335

Related U.S. Application Data
[63] Continuation of Ser. No. 121,463, March 5, 1971, abandoned.

[30] Foreign Application Priority Data
Mar. 7, 1970 Germany............................ 2010806
Mar. 7, 1970 Germany............................ 2010807

[52] U.S. Cl. ........ 24/68 CT, 24/201 A, 24/230 AS, 254/78, 280/480
[51] Int. Cl............................................. B60d 1/00
[58] Field of Search.. 24/68 R, 68 CT, 68 TT, 68 T, 24/68 D, 68 CD, 69 R, 69 CT, 69 TT, 69 T, 69 ST, 69 WT, 70 CT, 201 A, 230 AS, 211 P; 254/77, 78; 280/480

[56] References Cited
UNITED STATES PATENTS
| | | | |
|---|---|---|---|
| 1,241,364 | 9/1917 | Ferris............................ | 24/68 CT X |
| 2,564,821 | 8/1951 | Smith.................................... | 254/78 |
| 2,587,874 | 3/1952 | Mockel............................ | 24/68 CT |
| 2,947,514 | 8/1960 | Goss .................................... | 254/78 |
| 3,414,942 | 12/1968 | Jansson............................... | 24/69 T |
| 3,486,204 | 12/1969 | Hurtner et al. ................... | 24/201 A |

FOREIGN PATENTS OR APPLICATIONS
1,078,799  3/1960  Germany......................... 24/230 AS

*Primary Examiner*—Leo Friaglia
*Attorney, Agent, or Firm*—Markva & Smith

[57] ABSTRACT

A coupling arrangement capable of being released while the coupling is under considerable tension and particularly adapted to connect an object to a roller chain or similar device having at least two cross elements like the rollers of a chain. A lever has an offset front end which engages one of the cross members and has a coupling element pivoted to its other end to engage the other crossed element. The offset end of the lever is recessed to pivotally engage the first cross element and the coupling element has a recess which engages under the second cross element. The line of force between the lever and object is offset to one side of the first cross element to provide a moment of force that assists pivoting the lever to a released position about the first cross element. A spring urged latch normally maintains the coupling element in its locked position in which pivotal movement of the lever about the first cross element is prevented.

10 Claims, 5 Drawing Figures

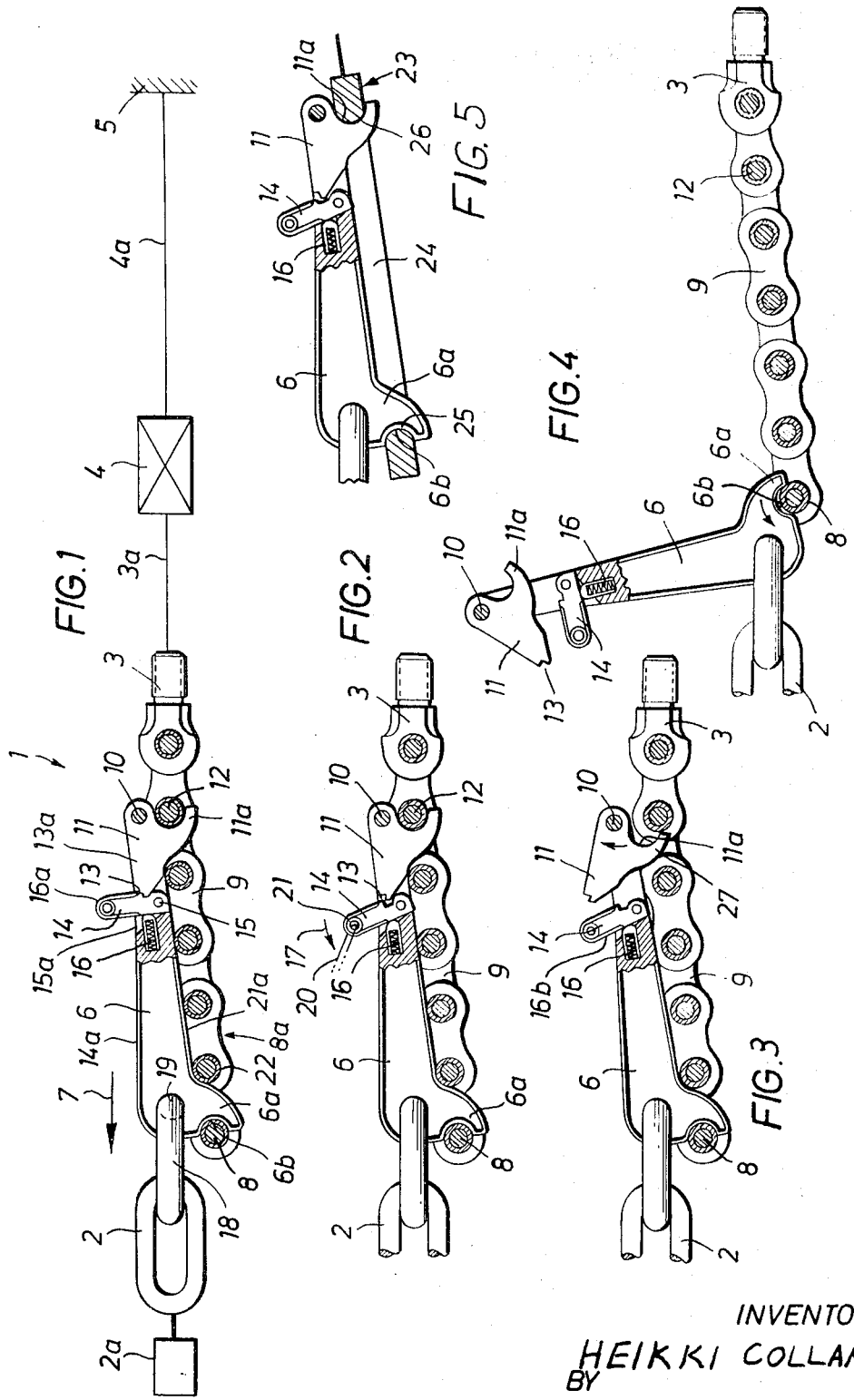

COUPLING RELEASABLE UNDER TENSION

This is a continuation of application Ser. No. 121,463, filed Mar. 5, 1971 and now abandoned.

This invention relates to a coupling for connecting an object to a traction device and which coupling can be readily released even though the coupling is under substantial tensile stress.

When trailing or towing vehicles or other objects, particularly on an uphill grade, it is frequently desirable to release the trailing vehicle from the pulling vehicle or other traction unit. While it may be possible to maneuver the towing vehicle so the towed vehicle is braked and there is no tension in the connection between the vehicles, and while it may be possible to manipulate the traction unit and then brake the towed vehicle so there is no tension in the connection between the traction unit and the vehicle, it is frequently inconvenient and time-consuming to relieve the tension in for example, the towing cable before disconnecting the towed vehicle. Therefore, it is high desirable to have a coupling which can for example, couple two vehicles together and can be released while the coupling is under considerable tension. Another area where a coupling which can be released while under considerable tension has advantage, is in the ordnance field. For example, for cleaning and for other reasons, it is frequently necessary to pull the barrel of a large gun rearwardly against the action of its recoil brake. During normal operation of such a weapon, the barrel automatically moves to a rear position as a result of the recoil from firing a projectile and then returns to its firing position automatically because of the action of the recoil brake. Since in many instances, it is desirable to move the barrel rearwardly against the action of the recoil brake and then quickly release the barrel so it can move forwardly under the action of the brake, a coupling capable of being released while under considerable tension is again highly desirable. While it would be possible to allow the barrel to move forwardly as force is released from the traction unit, such slow release requires a more expensive and complicated traction unit which is undesirable.

This invention relates to a coupling arrangement capable of being uncoupled while there is considerable tension acting on the coupling between a traction unit and an object, for example, a vehicle or gun barrel. The coupling arrangement is such that the object and traction unit can be quickly and safely connected together and can be readily disconnected from each other even while there is a substantial pull on the coupling.

In the preferred arrangement, one part of the coupling includes a lever with an offset front end that engages behind a first cross element of a second coupling part, and resists tensile forces acting on the coupling. The other end of the lever has pivotally connected thereto a connecting element having a recess formed therein which engages a second cross element of the second connector part. The recesses of the offset portion of the lever and the connecting element face in opposite directions, in the locked position of the coupling so the second coupling part can be a flexible element such as a roller or block chain. A quick release trigger latches the coupling element in its coupling position against release except when desired. The object to be pulled is connected to the lever at a location to one side of the first cross element whereupon the force exerted on the coupling tends to pivot the lever about the first cross element in an attempt to release the coupling. Such release however is resisted by the coupling element until the trigger is operated to release the coupling element. Hence, even when under tension, the coupling arrangement can be readily released because its release is in part assisted by the tension acting on the coupling. A leg portion of the coupling element functions as a cam to assist connecting the lever to the second coupling part when the coupling element is pivoted toward its latched position in which the coupling is locked.

Numerous other features and advantages of the invention will become apparent with reference to the accompanying drawings which form a part of this specification and in which:

FIG. 1 is a schematic view of a coupling arrangement according to this invention and showing the coupling in its locked position;

FIGS. 2, 3 and 4 are views corresponding to FIG. 1 and showing the sequence of motion which occurs to release the coupling after it is unlatched; and FIG. 5 is a view corresponding to FIG. 1 showing another embodiment of a second coupling part.

Referring now to the drawings and particularly to FIG. 1 there is shown the coupling arrangement 1 according to this invention. An object 2a, which is to be moved, is connected to one part of the coupling arrangement via a pulling element in the form of a chain 2. The other part of the coupling arrangement is connected for example, adjacent its end 3, to a cable 3a connected to a traction unit 4 which in turn is anchored against movement by a cable 4a secured at 5. Hence, object 2a is coupled to traction unit 4 by coupling arrangement 1.

The object 2a to be moved can be a gun barrel which it is desired to move toward traction unit 4 against the action of a recoil brake, or can be a vehicle which it is desired to pull toward the traction unit. In both instances, it is desirable and necessary to be able to release the coupling arrangement so object 2a is released from traction unit 4, and with the coupling arrangement of this invention, such release can be readily accomplished while the object 2a exerts a substantial tensile force on the coupling arrangement as indicated by the arrow 7.

Traction unit 4 can be a mechanical traction device such as a winch, or alternativley, can be a hydraulic or pneumatic motor which exerts a substantial pull on cable 3a to move the object 2a toward the traction unit via the coupling arrangement 1 and associated cables or pulling elements.

The coupling arrangement includes a first coupling part in the form of an elongated lever 6 having an offset front end or nose portion 6a provided with an arcuate recess 6b which faces in the same direction as the force 7 exerted on the coupling arrangement by the object 2a. The second part of the coupling takes the form of a block or roller chain 8a and includes a first cross element in the form of a cylindrical roller element 8 which provides a projection engaging the arcuately curved surface of recess 6b of the offset portion 6a of lever 6. Chain 8a is of the usual construction for a roller or block chain and includes links 9 which interconnect the several cross element rollers of the chain.

Pivotally mounted on the opposite end of the lever from offset nose portion 6a by a pivot pin 10 is a coupling element 11. Coupling element 11 has an arcuately curved recess 11a, the concave surface of which engages a second cross element in the form of a cylindrical roller 12 of chain 8a. Recess 11a faces in a direction opposite to recess 6b, and in the locked position shown at FIG. 1, recess 6b has a portion engaging under roller 8 to prevent upward separation of nose portion 6a of the lever from chain 8a, and recess 11a has a portion engaging under roller 12 to prevent upward separation of the coupling element 11 from the chain 8a.

Coupling element 11 is generally triangular in configuration and includes a tail portion 13a provided with a shoulder 13 facing in the direction of clockwise pivotal movement of the coupling element 11. As shown at FIG. 1, with the coupling element 11 in its locked position, tail portion 13a extends toward the front end of the lever.

A latch or trigger element 14 is pivotally secured to lever 6 at a pivot connection 15 with its axis parallel with pivot pin 10 and spaced from the pin 10 by a distance approximately equal to one-third the length of the lever. Trigger 14 takes the form of a relatively short arm projecting upwardly beyond upper edge 14a of the lever and is positioned in a recess 15a of the lever for pivotal movement about the pivot connection 15. Formed in side edge 16a of lever 14 at a location closely adjacent pivot connection 15 is a recess, the upper edge of which presents a shoulder 15b which extends across shoulder 13 of coupling element 11 to lock the coupling element against pivotal movement in a clockwise direction. A spring loaded pin 16 seated in an opening that opens toward recess 15a, engages the opposite side edge 16b of trigger 14 to normally urge the trigger to the latched position shown at FIG. 1. To release coupling element 11 from its locked position of FIG. 1, it is merely necessary to move trigger 14 in a counter-clockwise direction against the action of spring loaded pin 16, as shown by the arrow 17, FIG. 2, whereupon, should 15b is out of the patch of travel of shoulder 13 so coupling element 11 is free to pivot in a clockwise direction.

Chain 2 has an end link 18 which is pivotally connected to lever 6 at an opening 19 through the lever. With reference to FIG. 1, it will be observed that the point of connection of link 18 to the lever at opening 19 is generally along the longitudinal axis of lever 6 and is offset to one side of the area of engagement of roller 8 with recess 6b. By virtue of this arrangement, the force 7 creates a moment of force tending to pivot lever 6 in a counter-clockwise direction, and around roller 8 which moment of force is resisted by the engagement of recess 11a of coupling element 11 with the roller 12. However, opening 19 is offset only slightly from roller 8 so the lever arm between the axis of roller 8 and the axis of opening 19 is relatively short, and hence, the moment of force tending to pivot lever 6 in a counter-clockwise direction is relatively small even though the force 7 may be quite great. By virtue of the pivot connection 10 at the opposite end of the lever, the force which must be resisted by the coupling element 11 and roller 12 is quite small because the lever has substantial length and hence, even if a substantial force moment is tending to pivot the lever counterclockwise about roller 8, the resisting force is relatively small because of the length of the lever. In addition, since shoulder 15b is formed on trigger 14 at a location closely adjacent pivot connection 15, leverage is obtained whereby trigger 14 can readily be moved to the position of FIG. 2 wherein shoulder 15b is out of the path of travel of shoulder 13 and coupling element 11 is free to pivot in a counter-clockwise direction even though there is a substantial frictional force between the shoulders.

Release of the Coupling Arrangement

To release the coupling arrangement 1 it is merely necessary to move trigger 14 in the direction of arrow 17 so shoulder 15b clears shoulder 13a of connecting element 11. Such release can be accomplished by for example, striking edge 16a of the trigger with for example, a hammer, or alternatively, by pulling on a rope or wire 20 threaded through an opening 21 in the upper end of the lever.

Upon movement of trigger 14 to the position of FIG. 2, the force 7 acting on lever 6 at a location offset to one side of roller 8 creates a moment of force which causes lever 6 to pivot in a counter-clockwise direction about roller 8. Such pivotal movement is permitted because coupling element 11 is now free to pivot about pin 10 so recess 11a is disengaged from roller 12 as coupling element 11 pivots in a clockwise direction. When the coupling element 11 pivots to its released position as shown at FIG. 3, the moment of force exerted by chain 2 on the lever continues to pivot lever 6 in a counter-clockwise direction about roller 8 until lever 6 reaches the position of FIG. 4 whereupon the lever is completely separated from chain 8a and the coupling is disconnected.

With reference to FIG. 1, it will be observed that with the lever in its locked position, the lower edge 21a of the lever engages the several rollers 22 of chain 8a which are located between the rollers 8 and 12. In addition, it will be observed that recesses 11a and 6b face in opposite directions away from each other with the result that roller 12 cannot move toward roller 8b even though there is considerable slack in chain 8a, and hence, secure coupling is provided without danger of release even when chain 8a is slack. Lever 6 can also be readily released from chain 8a even where there is no force 7 acting on the lever merely by moving trigger 14 to the FIG. 2 position and then pulling upwardly on a convenient portion of the lever adjacent the trigger to pivot the lever in a counter-clockwise direction about roller 8.

While the coupling arrangement of this invention has particular utility where the first part of the coupling includes the lever 6 and the second part of the coupling is a roller or block chain 8a, the second part of the coupling need not be a chain. As shown at FIG. 5, the second part of the coupling can take the form of a rigid plate or block 23 having a generally rectangular opening 24 formed therein. The front and rear edges 25 and 26 of the opening are generally rounded to provide cylindrical bearing surfaces for engagement respectively with recesses 6b of lever 6 and 11a of coupling element 11. Release of the lever 6 from coupling block 23 while the coupling parts are under tension is the same as previously described for the chain 8a with reference to FIGS. 2-4.

Connection of lever 6 to either chain 8a or coupling block 23 is readily accomplished in the following manner. First, lever 6 is grasped and moved to the position of FIG. 4 in which recess 6b engages chain roller 8. Then, the operator pivots the lever in a clockwise direction about roller 8 until edge 21 of the lever is adjacent the intermediate rollers 22. Then, coupling element 11 is pivoted in a clockwise direction so cam leg 27 of the coupling element swings under roller 12 and urges the lever to its coupled position. By virtue of the action of the spring urged pin 16, moving the coupling element 11 to the position of FIG. 2 automatically pivots trigger 14 away from tail 13a of the coupling element so the trigger snaps into the latched position of FIG. 1 as soon as shoulder 13 is below shoulder 15b.

While several preferred embodiments of a coupling device capable of being released under considerable tension have been shown and described, it is to be understood that such a coupling arrangement can be used whenever it is desired to provide for coupling in a simple manner, and rapid and safe release of a coupling while under considerable tension.

What is claimed is:

1. A releasable coupling comprising
   a. first coupling means including at least two cross elements spaced from each other,
   b. second coupling means including a lever having means for engaging one of said cross elements and a coupling element for engaging the other of said cross elements,
   c. pivot means mounting said coupling element on said lever for pivotal movement to a release position in which said lever is free to swing relative to said first cross element, and
   d. latch means normally holding the coupling element in a coupling position and operable to release said coupling element for movement to said release position,
   e. whereby said first and second coupling means may be released from each other while under tension.

2. A releasable coupling according to claim 1 further comprising connecting means for connecting said first and second coupling means respectively to an object and to a traction unit.

3. A releasable coupling according to claim 1 wherein said one cross element and lever, and said other cross element and coupling element respectively include cooperating recess and projection means for preventing separation of said second coupling means from said first coupling means in a direction transversely of said lever.

4. A releasable coupling according to claim 3 wherein said cooperating recess and projection means include bearing surfaces on each of said cross elements and cooperating bearing surfaces on said lever and coupling element respectively.

5. A releasable coupling according to claim 4 wherein said recess means of said lever and said coupling element face in opposite directions.

6. A releasable coupling according to claim 1 wherein said first coupling means is a chain, said cross elements being cylindrical cross elements of said chain.

7. A releasable coupling according to claim 1 wherein said lever is axially elongated, said means for engaging one of said cross elements being offset transversely of the longitudinal axis of the lever and said coupling element being pivotally mounted on said lever adjacent the opposite end thereof.

8. A releasable coupling according to claim 1 wherein said coupling element includes a first shoulder and said latch means includes a second shoulder for engaging said first shoulder for normally holding said coupling element in a coupling position, said releasable coupling further comprising spring means normally urging said latch means toward a position in which said shoulders interengage to maintain the coupling element in its coupling position.

9. A device for releasably engaging a pair of elements spaced from each other comprising
   a. a lever having means for engaging one of said elements,
   b. a coupling element for engaging the other of said elements,
   c. pivot means mounting said coupling element on said lever for pivotal movement to a release position in which said lever is free to swing relative to said one element, and
   d. latch means normally holding the coupling element in a coupling position and operable to release said coupling element for movement to said release position,
   e. whereby said device may be released from said pair of elements while biased in a direction substantially parallel to the plane of said elements.

10. A device for releasably engaging a chain at a plurality of locations along the length thereof, said chain having a plurality of cross elements spaced from each other, said device comprising
   a. a lever having means for engaging one of said cross elements,
   b. a coupling element for engaging another of said cross elements,
   c. pivot means mounting said coupling element on said lever for pivotal movement to a release position in which said lever is free to swing relative to said one cross element, and
   d. latch means normally holding the coupling element in a coupling position and operable to release said coupling element for movement to said release position,
   e. whereby said device may be released from said chain while biased in a direction substantially to the plane defined by said one and another of said cross elements.

* * * * *